Oct. 31, 1972   J. L. ARNAUD   3,701,637
PROCESS FOR LEACHING STRONTIUM SULFIDE BLACK ASH
Filed June 30, 1970   2 Sheets-Sheet 1
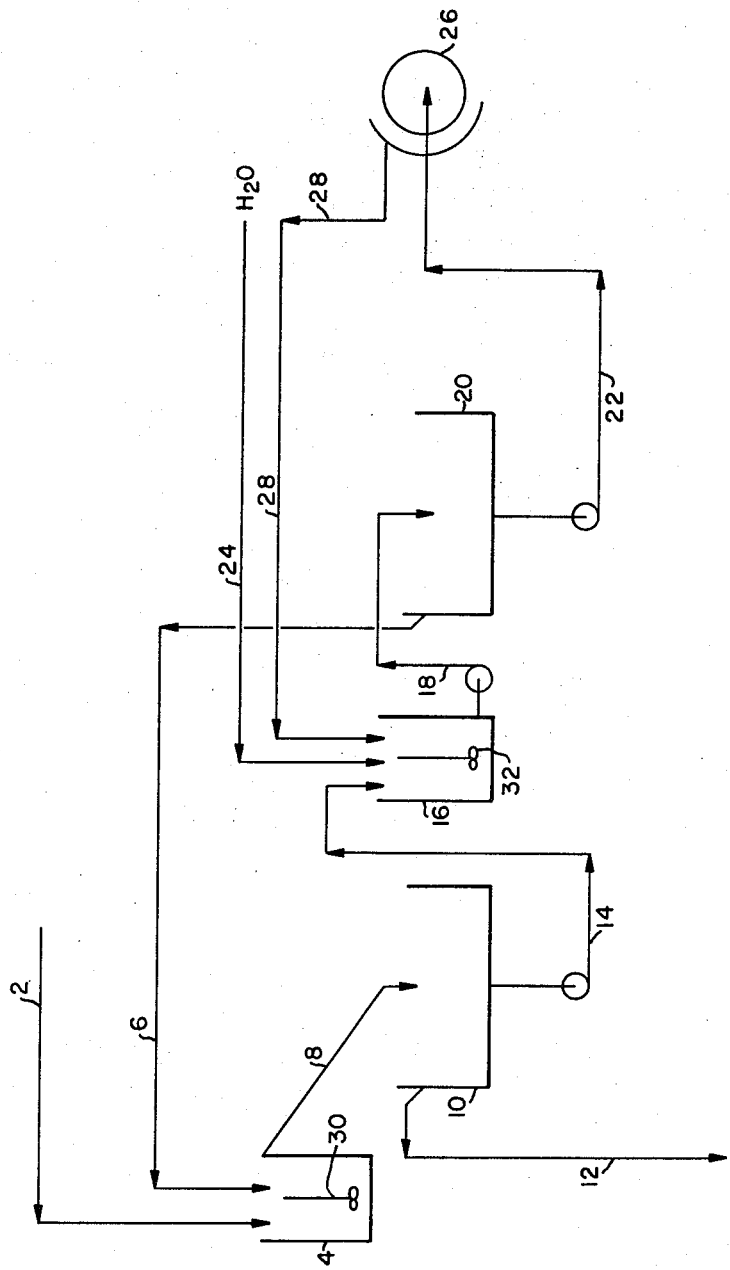
FIG. I
INVENTORS
JOSE L. ARNAUD
BY FRANK IANNO
EUGENE G. SEEMS
PAULINE NEWMAN

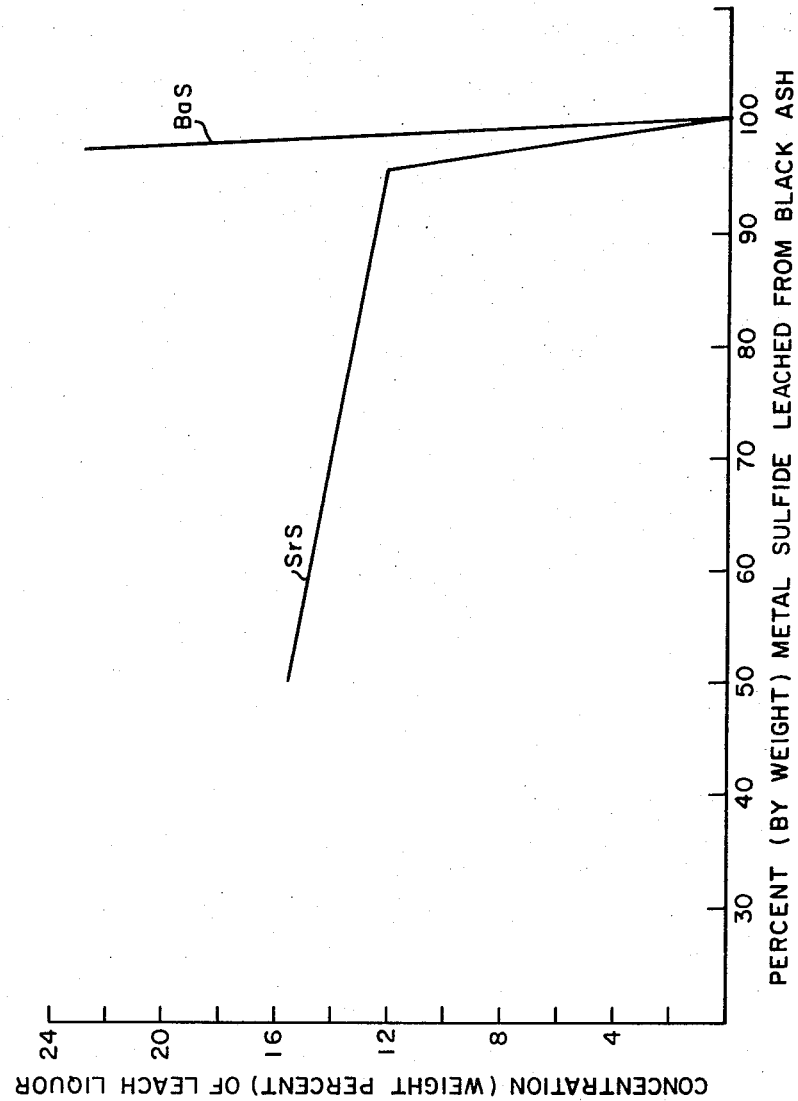

3,701,637
PROCESS FOR LEACHING STRONTIUM SULFIDE BLACK ASH
Jose L. Arnaud, Modesto, Calif., assignor to FMC Corporation, New York, N.Y.
Filed June 30, 1970, Ser. No. 51,113
Int. Cl. C01f 11/04, 11/10; B01d 11/02
U.S. Cl. 23—312 R          3 Claims

ABSTRACT OF THE DISCLOSURE

An improved process is described for leaching strontium sulfide black ash with an aqueous solvent in which at least 90% of the strontium sulfide values are extracted by an aqueous solvent, in a plurality of leaching stages, by treating the black ash in at least one leaching stage with an aqueous solvent so as to obtain an extract having no more than 12% by weight of strontium sulfide.

BACKGROUND OF THE INVENTION

(A) Field of the invention

The present invention is directed to an improved leaching process whereby large quantities (at least 90%) of strontium sulfide values in strontium sulfide black ash are recovered.

(B) Description of the prior art

It is known that alkaline-earth metals such as barium, strontium, and the like can be recovered from "black ash" by leaching the alkaline-earth metal sulfide values from impurities present in the black ash. Black ash is the product which is obtained when an alkaline-earth metal ore is reacted with carbon at temperatures above 1000° C. to convert the alkaline-earth metals to their sulfides. The resulting product normally contains the corresponding metal sulfides, unreacted ore and various impurities. For economic operation it is necessary to extract a relatively large proportion of the metal sulfides from this mass. In general, the extraction of a metal such as barium in the form of its barium sulfide can easily be achieved in a single stage leaching process by treating the black ash with water and removing a barium sulfide solution containing up to 22%, by weight, barium sulfide. This one stage leaching operation is easily carried out at extremely high efficiencies on the order of 95% and above. However when a similar leaching operation is attempted with a strontium sulfide black ash, serious obstacles present themselves. The major difficulty is that the strontium sulfide extraction efficiencies are very low when workable and economic concentrations of strontium sulfide are obtained for further processing, e.g. 14% by weight strontium sulfide or above. If more than one extraction stage is utilized to leach out the strontium sulfide to its maximum solubility in each stage, the efficiency improves, but still is very low, resulting in large quantities of strontium sulfide remaining behind in the black ash. Retention of 30% or more of the strontium sulfide values in the black ash is not uncommon. As a consequence, commercial leaching operations for recovering strontium sulfide, has been seriously hampered by the relatively poor recovery of strontium values from a strontium black ash.

Accordingly it is desired to find a process in which higher extraction efficiencies of strontium sulfide from the strontium sulfide black ash can be obtained and in which the extraction stages are simply operated and commercially acceptable.

SUMMARY OF THE INVENTION

I have now found that strontium sulfide values can be leached from strontium sulfide black ash so that at least 90% of the strontium sulfide values are removed from the black ash in a plurality of leaching stages by treating the black ash in at least one leaching stage (except the product extract stage) with an aqueous solvent so as to obtain an extract having no more than 12% by weight of strontium sulfide; in the product extract stage, where the highest concentration of strontium sulfide is obtained, the maximum concentration of the extract can be up to 21% by weight strontium sulfide.

BRIEF DESCRIPTION OF THE DRAWING

In FIG. 1 a diagrammatic flow plan of an embodiment of the invention is shown.

FIG. 2 is a graph showing the percent (by weight) metal sulfide leached from black ash (or leaching efficiency) versus the concentration of the leach liquor, for both barium sulfide and strontium sulfide.

DESCRIPTION OF THE INVENTION AND THE PREFERRED EMBODIMENTS

The strontium sulfide black ash which is treated in accordance with the present invention can be prepared by a number of techniques. One which is conventionally used is to treat a strontium ore, which normally contains strontium in the form of strontium sulfate, by suitably grinding the ore and subsequently reacting the ground ore with coke in a furnace at temperatures in the order of 1000° C. or above. The product of this reaction is termed "black ash" and is an impure strontium sulfide product mixture. This mixture contains impurities and unreacted compounds which must be separated from the strontium sulfide values which are desired. It is desired to make clear that the present invention does not include any process for producing the black ash and that any suitably obtained black ash may be processed in accordance with the present invention.

The black ash is treated with an aqueous solvent in countercurrent fashion in a plurality of leaching stages. This can best be described by reference to FIG. 1 of the drawings. The black ash containing strontium sulfide values flows through conduit 2 into an extractor 4, along with a strontium sulfide aqueous leach liquor through conduit 6, and are kept in intimate contact by mixer 30 in the extractor. In extractor 4, a portion of the strontium sulfide values in the black ash are extracted and the mixture in extractor 4 is passed through line 8 into settler 10. The aqueous extract from this initial extraction stage can range up to a maximum concentration of about 21% by weight of strontium sulfide. Normally the concentration of the product extract which comes from this initial stage and which is removed through line 12, has a concentration of from about 14 to about 18% by weight strontium sulfide. The product extract which is removed through line 12 is then forwarded for processing of the strontium sulfide to strontium carbonate or other strontium salts as desired. The settled solids in settler 10 are passed by line 14 to a second extraction stage in extractor 16. In extractor 16 the black ash is mixed with hot water which is admitted through line 24 and they are kept in intimate contact by mixer 32 in the extractor. The slurry from the second extraction stage, extractor 16, is then passed by line 18 into a second settler 20. The extract from this stage is removed from settler 20 by line 6 to extractor 4. It is essential that during the extraction in extractor 16 and settler 20 that the strontium sulfide extract have a concentration no greater than about 12% by weight of strontium sulfide. The settled solids in settler 20 are passed by line 22 to a dewatering filter 26, to remove the last traces of the aqueous solvent containing leached strontium sulfide values. The filtrate is then passed through line 28 to extractor 16 to serve as part of the extraction liquor for extracting black ash in extractor 16.

The reason for limiting the concentration of the extract in this stage can be readily seen by reviewing FIG. 2 of the drawings. In FIG. 2 there is plotted on the horizontal axis the percent, by weight, of strontium sulfide leached (which also may be termed leaching efficiency), while on the vertical axis there is plotted the concentration of strontium sulfide in the extract. As will be readily observed, if extraction of strontium sulfide is attempted where the concentration of the extract is greater than about 12%, the percent strontium sulfide leached (or leaching efficiency) decreases very sharply with very small increases in concentration of the extract. However once the critical point of 12% strontium sulfide is reached, there is a break in the curve and leaching efficiencies climb rapidly with decreasing concentrations of strontium sulfide in the extract. Accordingly if the extraction of strontium sulfide from black ash is carried out in at least one stage of a multi-stage extraction process so as to obtain an extract containing no higher than 12% by weight of strontium sulfide, over 90% of the strontium sulfide in the black ash is leached and frequently the leaching efficiency runs over 95%.

It is most unexpected to find that such small difference in concentrations of the extract results in disproportionately large leaching efficiencies. For comparison purposes, FIG. 2 also includes the leaching efficiencies of barium sulfide at various extract concentrations. In the case of barium sulfide, the situation is entirely different. Extraction can be carried out at concentrations well above 20%, with greater than 95% efficiencies without any difficulty. In fact whether one utilizes extract concentration of from 5 to 20%, the difference in leaching efficiency of barium sulfide is essentially negligible.

In conventional leaching operations, it is normally desired to obtain as much of the product which is being leached as can be obtained in each of the leaching stages up to the product extract stage. Maximum leaching is thus obtained. This is not true when leaching strontium sulfide if extraction efficiencies of greater than 90% are to be obtained.

The leaching can be carried out at any temperature up to the boiling point of the extract. Higher temperatures are preferred because they permit working with higher concentrations of strontium sulfide. A preferred temperature for operation is from about 85° to about 100° C.

The following example is given to illustrate the invention and is not deemed to be limiting thereof.

EXAMPLE 1

A black ash containing 76% by weight of strontium sulfide was leached in an apparatus as shown in FIG. 1 at a temperature of about 100° C. The numbers used in FIG. 1 to identify the pieces of equipment will be used herein to identify the apparatus and feed streams employed. The black ash was passed at a rate of 100 pounds per minute (lbs./min.) through conduit 2 into extractor 4, along with 725 lbs./min. of a 6.5% by weight aqueous extract of strontium sulfide through conduit 6. In extractor 4, the ingredients were mixed in intimate contact by means of an impeller 30. The overflow from extractor 4 flowed into a primary settler 10. After allowing the agitated mixture to settle, 556 lbs./min. of a solution was drawn off as the product extract through conduit 12 from settler 10; it contained 74.5 lbs. of strontium sulfide and 481 lbs. of water per 556 lbs. of solution. The remaining, settled slurry in settler 10, was removed at a rate of 269 lbs./min. through conduit 14 and passed to extractor 16. The slurry contained 196 lbs. of water, 49 lbs. of strontium sulfide (30 lbs. of leached strontium sulfide and 19 lbs. of unleached strontium sulfide) and 24 lbs. of inerts per 269 lbs. of slurry. Water was passed through conduit 24 into extractor 16, at a rate of 558 lbs./min. In addition filtrate from filter 26 was constantly recycled through line 28, sufficient to return 5.8 lbs./min. of strontium sulfide to the extractor 16. The mixture was agitated in extractor 16 using impeller 32 to obtain intimate contact of the solids and liquids. The mixture was then passed into settler 20 through conduit 18. In settler 20, the mixture was allowed to settle and the extract, containing 6.5% by weight strontium sulfide, was removed through conduit 6 at a rate of 725 lbs./min. and passed to extractor 4. The settled slurry from settler 20 was removed through conduit 22 at a rate of 128 lbs./min. and passed to a dewatering filter 26. The slurry contained 96 lbs. of water, 6.5 lbs. of leached strontium sulfide, 1.5 lbs. of unleached strontium sulfide and 24 lbs. of inert matter per 128 lbs. of slurry. The slurry after being filtered on a dewatering filter 26, yielded per minute, a filter cake containing 24 lbs. of inert matter, 0.75 lb. of unleached strontium sulfide, 0.75 lb. of leached strontium sulfide and residual water. The filter cake was discarded, while the filtrate was recycled to extractor 16 through conduit 28; the filtrate recycle returns about 5.8 lbs. of leached strontium sulfide/min. to extractor 16. The extracting efficiency in extractor 16 alone when operated to yield an extract solution of 6.5% by weight strontium sulfide, was about 92.5%; overall efficiency was 98%.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

I claim:

1. A process of leaching strontium sulfide values from a strontium sulfide black ash with an aqueous solvent in a plurality of leaching stages, comprising passing black ash and an aqueous solvent countercurrently to one another and contacting each other in a plurality of leaching stages to obtain a final extract in a product extract stage having a maximum concentration of about 21% by weight of strontium sulfide, treating said black ash in at least one of said leaching stages except the product extract stage with a sufficient amount of water to obtain a strontium sulfide-containing extract having not more than 12% by weight strontium sulfide, whereby at least 90% of the strontium sulfide values are leached from said black ash in said at least one stage.

2. Process of claim 1 wherein the product extract contains from about 14 to about 18% strontium sulfide.

3. Process of claim 1 wherein the strontium sulfide-containing extract has a concentration of about 6.5% by weight strontium sulfide in one of said leaching stages.

References Cited

UNITED STATES PATENTS

| | | | |
|---|---|---|---|
| 1,861,058 | 5/1931 | Jaenecke | 23—312 R |
| 1,812,250 | 6/1931 | Stuer | 23—134 |

OTHER REFERENCES

R. Mellor: Comp. Treatise on Inorganic and Theoretical Chemistry, vol. III, 1923, pp. 740 and 741.

NORMAN YUDKOFF, Primary Examiner

S. J. EMERY, Assistant Examiner

U.S. Cl. X.R.

23—134, 310